(12) United States Patent
Stermann

(10) Patent No.: US 9,381,597 B2
(45) Date of Patent: Jul. 5, 2016

(54) MOVABLE BACKING SYSTEM

(71) Applicant: Airbus Operations GmbH, Hamburg (DE)

(72) Inventor: Dirk Stermann, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/643,595

(22) Filed: Mar. 10, 2015

(65) Prior Publication Data

US 2015/0258641 A1    Sep. 17, 2015

(30) Foreign Application Priority Data

Mar. 12, 2014    (EP) ..................................... 14159139

(51) Int. Cl.
*B23K 20/12*    (2006.01)
*B23K 37/04*    (2006.01)
*B23K 20/26*    (2006.01)

(52) U.S. Cl.
CPC ............. *B23K 37/0435* (2013.01); *B23K 20/12* (2013.01); *B23K 20/126* (2013.01); *B23K 20/26* (2013.01)

(58) Field of Classification Search
CPC ............. B23K 20/126; B23K 20/1245; B23K 20/123; B23K 20/125; B23K 20/12; B23K 20/1205; B23K 20/122; B23K 20/1225; B23K 20/127

USPC ................................ 228/112.1, 113, 114, 2.1
See application file for complete search history.

(56) References Cited

U.S. PATENT DOCUMENTS

| | | | |
|---|---|---|---|
| 6,237,835 B1 | 5/2001 | Litwinski et al. | |
| 2006/0016854 A1* | 1/2006 | Slattery | B23K 20/126 228/2.1 |
| 2013/0334289 A1 | 12/2013 | Pacchione et al. | |
| 2014/0034711 A1 | 2/2014 | Ostersehlte | |

FOREIGN PATENT DOCUMENTS

EP    2080579 A1    7/2009
WO    2009033157 A2    3/2009

OTHER PUBLICATIONS

European Patent Office, Extended European Search Report for European Patent Application No. 14 15 9139 mailed Oct. 10, 2014.

* cited by examiner

*Primary Examiner* — Erin Saad
(74) *Attorney, Agent, or Firm* — Ingrassia Fisher & Lorenz, P.C.

(57) ABSTRACT

Thus relates to a movable backing system for clamping plate-shaped backing work pieces for friction agitation welding and friction stir welding and to a friction agitation or stir welding system. The movable backing system comprises an upper unit to be arranged above the backing work pieces to support the backing work pieces, a lower unit to be arranged below the backing work pieces to support the backing work pieces, and a connecting means connecting the upper and the lower unit to be arranged in a gap between the backing work pieces to be welded.

18 Claims, 8 Drawing Sheets

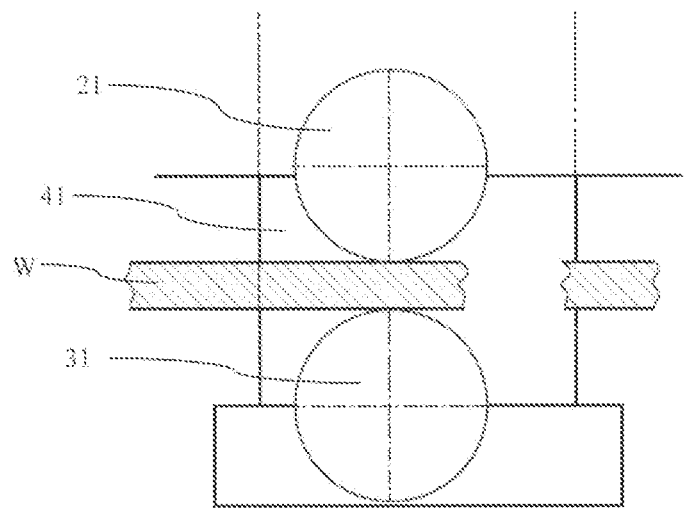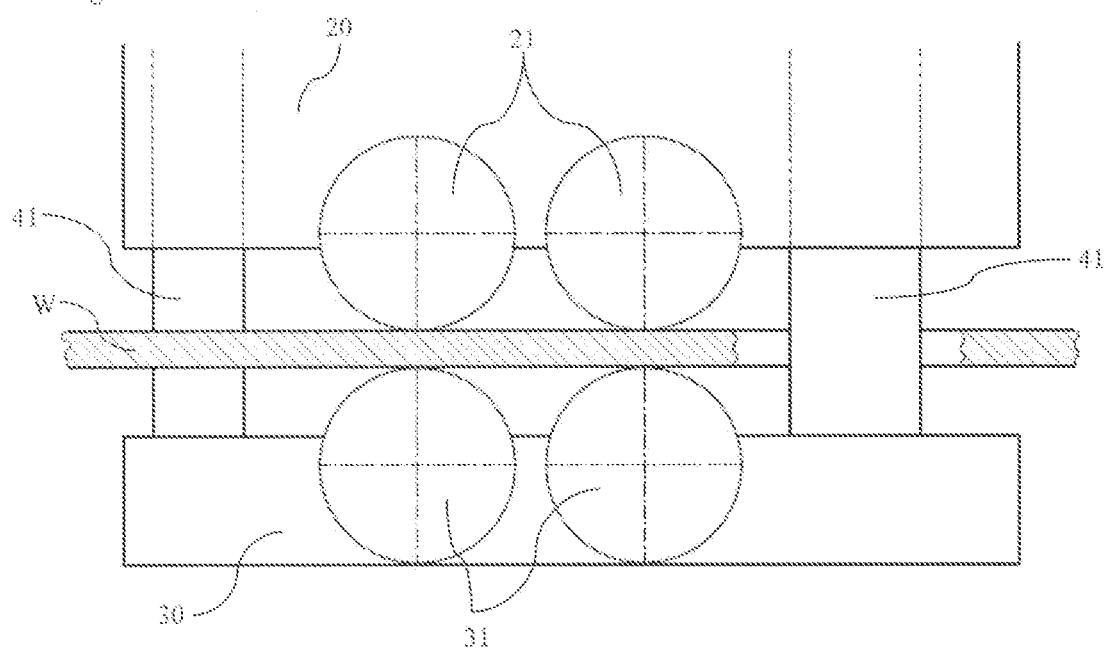

MOVABLE BACKING SYSTEM

CROSS-REFERENCE TO RELATED APPLICATION

This application claims priority to European Patent Application No.: 14 159 139.6 filed 12 Mar. 2014, which incorporated herein by reference in its entirety.

TECHNICAL FIELD

The subject matter described herein generally relates to a movable backing system for clamping plate-shaped work pieces for friction agitation or stir welding, to a friction agitation or stir welding system comprising the movable backing system, and to a welding tool for weld plate-shaped work pieces.

BACKGROUND

Friction agitation welding, and in particular friction-stir welding (FSW), is a solid-state joining process that uses a bobbin tool to join two abutting plate-shaped work pieces. Heat is generated between the tool and material that produces a very soft region near the bobbin tool. Then, the two pieces of metal mechanically intermix so that the softened metal can be joined using mechanical pressure applied by the bobbin tool. It is primarily used on aluminum and on structures that need superior weld strength without a post weld heat treatment. It is applicable in aircraft construction for longitudinally or circumferentially joining large parts as, for example, fuselage shells or fuel tanks.

US 2013/334289 A1 discloses a movable joining device for connecting structural components of an aircraft. The joining means is moveably arranged on a guiding device situated on the outside of the structural components so as to fixedly connect joining edges of the structural components positioned adjacent to each other. The joining means includes a welding unit that can move on a rail-like guiding device and is equipped with a special bobbin tool for friction stir welding.

US 2014/034711 A1 discloses a friction agitation welding process, wherein a rotating bobbin tool is moved along a weld between two plate-shaped work pieces, exerting a first and a second contact pressing force on first and second sides, respectively, and wherein the bobbin tool is subjected to an additional axial force during its movement along the weld to plastically deform the area of the created welding seam such that the welding seam is pressed towards one side of the plate-shaped work pieces while forming a welding seam elevation protruding opposite from the work piece surface.

However, a need still exists for an improved movable backing system to precisely clamp plate-shaped work pieces for friction agitation welding.

SUMMARY

In a first exemplary embodiment, a movable backing system for clamping plate-shaped work pieces for friction agitation welding, in particular friction-stir welding (FSW), is provided. It comprises an upper unit to be arranged above the work pieces to support the work pieces, a lower unit to be arranged below the work pieces to support the work pieces, and a connecting means connecting the upper and the lower unit to be arranged in a gap between the work pieces to be welded. The backing system cannot only be used for welding procedures, but for all kind of joining, clamping or aligning procedures.

Thus, very small, and very precisely defined gaps between the work pieces with tight tolerances can be implemented, leading superior welding quality. The clamping and alignment procedure is made easier and faster. As the clamping and alignment is provided before the welding, detrimental effects due to, for example, shrinking, bulging or lateral opening forces during welding can be prevented, further improving the welding quality. Further, since rigid interior backing can be omitted, a one-side weld can be performed, which is especially beneficial for use on aircraft structures with limited interior accessibility. It is even possible to join work pieces of different thicknesses.

According to a further exemplary embodiment, the upper unit comprises at least an upper roller and a lower unit that comprises at least a lower roller to define the position of the plate-shaped work pieces to be welded. The rollers can also be balls or even rollers supported by balls to balance lateral forces. The rollers can be arranged on all sides of the connecting means.

There may be two rollers in the upper unit and two rollers in the lower unit, two rollers in the upper unit and four rollers in the lower unit, four rollers in the upper unit and two rollers in the lower unit, and four rollers in the upper unit and four rollers in the lower unit. There may be more than four rollers, and, some rollers can also be combined to be formed by a single barrel.

According to a further exemplary embodiment, the connecting means is strip- or fiber-shaped, which means it can have an angular or round cross section. The connecting means may transmit a defined force between the upper and lower rollers to equalize thickness tolerances between sheets to be welded. The connecting means can be arranged between, and in particular centered between the rollers. The connecting means can be a single strip or fiber. The connecting means may also be two or more strips or fibers. The connecting means may furthermore be arranged outside the rollers, in particular outside the roller arrangement or even partially inside and partially outside the roller arrangement.

In a further exemplary embodiment, the upper and/or the lower unit comprises coupling means to couple the upper and the lower unit. The coupling means may provide a defined force between the upper and lower rollers to equalize thickness tolerances between sheets to be welded. The coupling means may be a tension spring, a pressure spring, a hydraulic cylinder, a pneumatic cylinder, a magnetic system and/or the like. The spring may be a disk spring, a circular spring, a spiral spring, a leaf spring or the like.

The coupling means may be arranged in the upper unit, or the lower unit. The coupling means may be a tension spring arranged in the upper unit to pull the lower rollers in the direction of the upper rollers or a pressure spring to push the upper rollers in the direction of the lower rollers. The coupling means may also be a pressure spring arranged in the lower unit to push the lower rollers in the direction of the upper rollers or a tension spring to pull the upper rollers in the direction of the lower rollers. The coupling means may also be a housing of the backing system acting as a leaf spring. The coupling means may act with a force of between about 50 N and 50 kN on the respective roller(s), preferably 100 N to 4 kN, and more preferably 300 to 1000 N.

The upper and/or the lower unit may comprise a sensor to monitor the movement of the movable backing system. The backing system may perform an online monitoring of the welding path. Measurement data (e.g. force or length measurements) can be used to adapt the welding path to the welding tool.

The strip may be exchangeable and may have a width or diameter between about 1 and 0.01 mm, preferably between about 0.5 and 0.09 mm, and more preferably between about 0.2 and 0.1 mm. The strip may have a low wear and a high tensile strength between about 500 and 2000 N/mm2, preferably between about 1000 and 1500 N/mm2, and more preferably between about 1200 and 1400 N/mm2 The strip may be made of ceramic, carbon, stainless steel or high alloy steel, in particular of a CrNi alloy or a Ni base alloy. The strip may be of X2CrNiMo17-12-2.

In a further embodiment, a friction agitation or stir welding system is provided. It comprises a movable backing system to clamp and align plate-shaped work pieces and a welding tool to weld plate-shaped work pieces. As the clamping and aligning function is provided by the backing system, these functions need not to be provided by the welding tool. The welding tool can therefore be correspondingly adapted or simplified. One or some of the components of the friction agitation or stir welding system may also comprise measurement sensors, as e.g. force measurement gauges, to control the path of the movable backing system and/or the welding tool.

In other words, a local work piece alignment and clamping prior to a friction agitation or stir welding with a welding or bobbin tool is provided. Each plate to be welded is supported at the upper and/or the lower side by at least one roller. A connection between the upper and/or the lower side is effected through a gap preceding the welding tool by means of a strip- or fiber-shaped connecting means extending through the gap. A coupling between the upper and/or the lower side is effected by means of, for example, a spring.

It shall be understood further that a preferred embodiments these and other objects, features, and advantages will become apparent from the following detailed description taken in conjunction with the accompanying drawings.

BRIEF DESCRIPTION OF THE DRAWINGS

FIGS. 7A-B illustrate show positions of rollers and connecting means in accordance with an embodiment;

DETAILED DESCRIPTION

Figure 1:
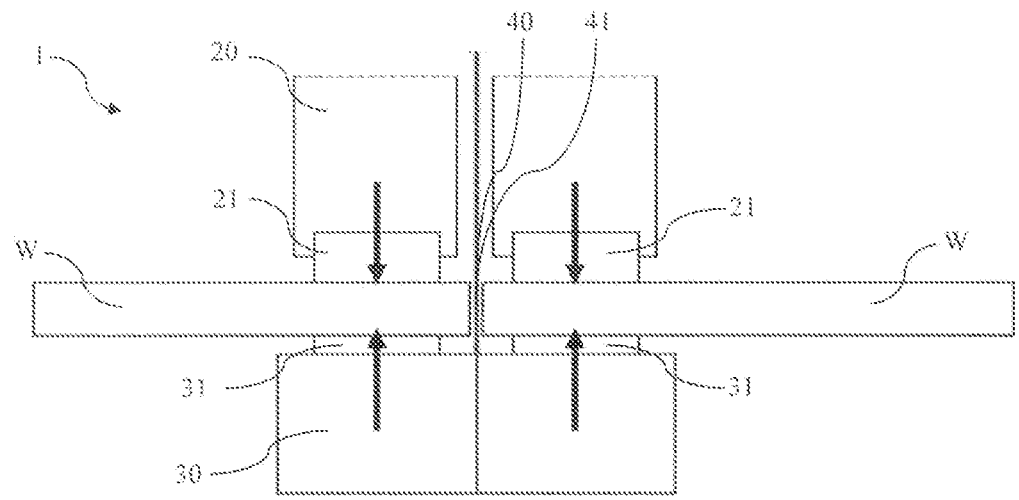
FIG. 1 is a lateral view of a movable backing system, in accordance with an embodiment.

FIG. 1 is a lateral view of a movable backing system 1 for clamping and aligning two plate-shaped work pieces W to be welded together by friction agitation welding, in particular friction stir welding, or otherwise. The backing system 1 comprises an upper unit 20 arranged above the work pieces W to support the work pieces W, and a lower unit 30 arranged below the work pieces W to support the work pieces W. The backing system 1 further comprises a connecting means 40 connecting the upper unit 20 and the lower unit 30. The connecting means 40 is here a strip 41, but can also be a fiber.

The upper unit 20 comprises two upper rollers 21, and the lower unit comprises two lower rollers 31 for clamping and aligning the work pieces W between each other, as shown by the arrows in FIG. 1. The rollers 21 and 31 define the position of the plate-shaped work pieces W to be welded. The rollers 21 and 31 are arranged on the left and the right side of the strip 40, that is the strip 40 has a roller 21 and 31 on each side. As will be shown in the following figures, other numbers and arrangements of rollers 21 and 31 and strips 40 are possible.

Figure 2:
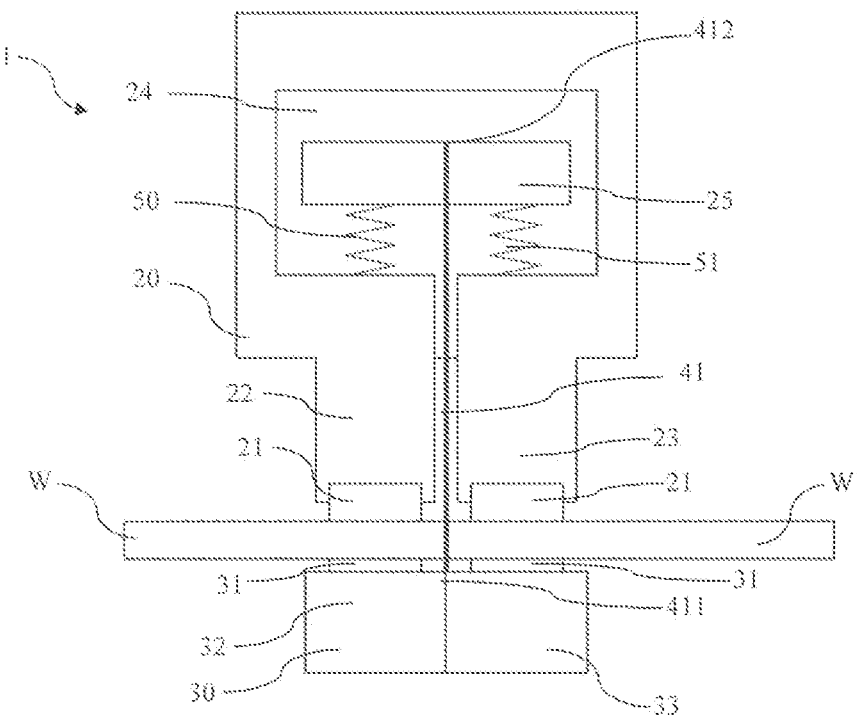
FIG. 2 shows the movable backing system of FIG. 1, in more detail.

FIG. 2 schematically shows a further lateral view of the movable backing system 1 in more detail. The upper and the lower units 20 and 30 comprises coupling means 50 for coupling the upper and the lower unit 20 and 30. The coupling means 50 can be a pressure spring, a tension spring, a hydraulic cylinder, a pneumatic cylinder, and/or a magnetic system. In FIG. 2, the coupling means 50 is shown as two springs 51, in particular tension springs. The springs 51 are arranged in a recess 24 of the upper unit 20, but can also be arranged elsewhere, e.g. outside upper unit 20. The springs 51 pull the lower rollers 31 in the direction of the upper rollers 21 and therefore towards the work pieces W to be welded.

A lower end 411 of the strip 41 is gripped between two adjacent parts 32 and 33 of the lower unit 30 and is arranged between two adjacent lower rollers 31. An upper end 412 of the strip 41 is arranged between two adjacent upper rollers 21 and two adjacent parts 22 and 23 of the upper unit 20 and is gripped in the recess 24 of the upper unit 20. The strip 41 is gripped in detail between two adjacent parts of a bar 25 coupled by the springs 51 with the upper unit 20.

Figure 3:
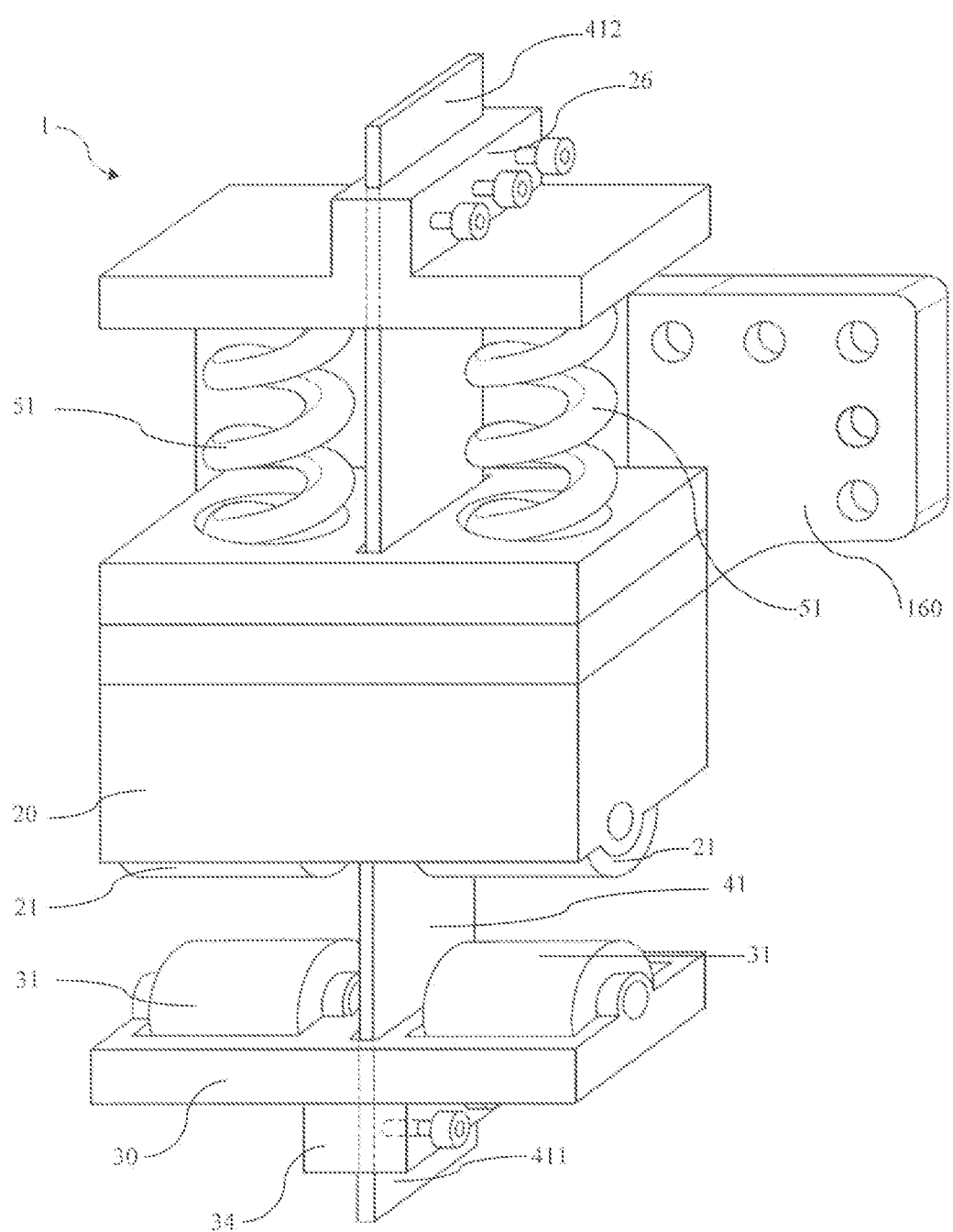
FIG. 3 is a 3D view of a movable backing system, in accordance with an embodiment.

FIG. 3 is a 3D view of the movable backing system 1. It comprises the upper unit 20 and the lower unit 30. The upper unit 20 comprises two upper rollers 21, and the lower unit comprises two lower rollers 31. The backing system 1 further comprises the strip 41 connecting the upper unit 20 and the lower unit 30 and two springs 51 to couple the upper and the lower units 20 and 30. As can be seen in detail, the upper and lower ends 412 and 411 of the strip 41 are, for example, screwed to projections 26 and 34 of the upper and lower units 20 and 30 and pass there between. The movable backing system 1 further comprises an interface 160 to be connected to a welding tool (not shown herein).

The springs 51 provide a defined force between the upper and lower rollers 21 and 31 to equalize thickness tolerances between the work pieces W to be welded. The strip 41 transmits the defined force between the upper and lower rollers 21 and 31 to equalize thickness tolerances between the work pieces W.

Figure 4:
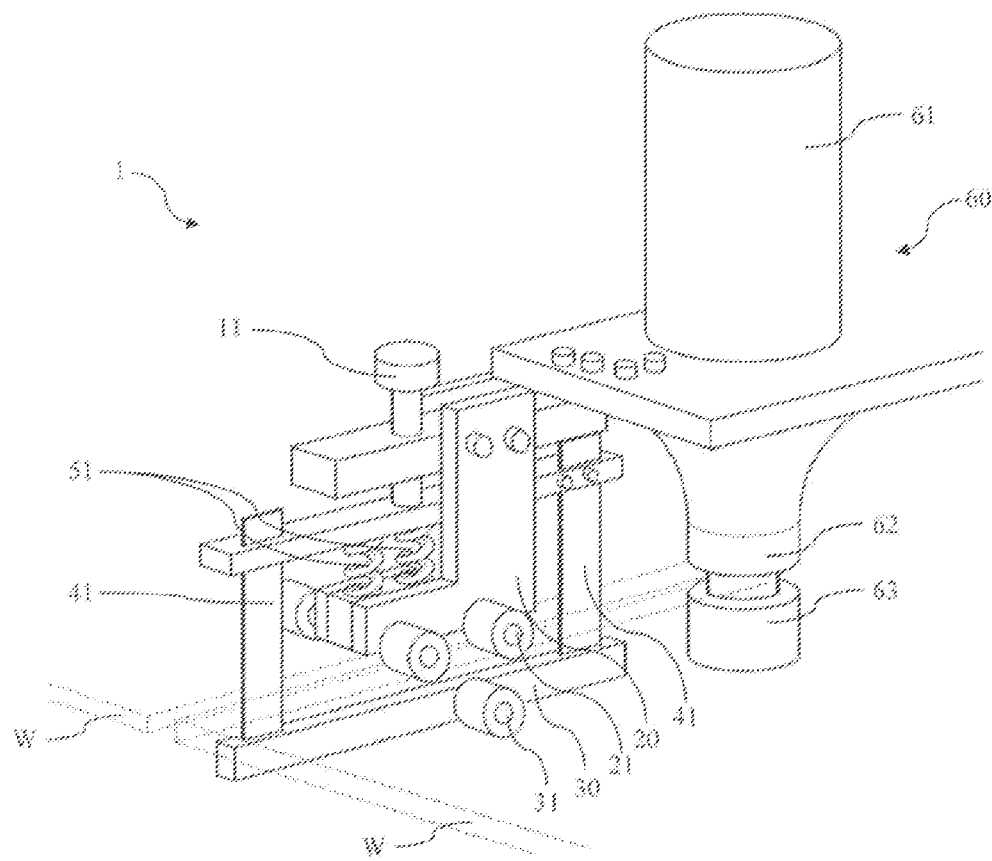
FIG. 4 schematically is a 3D view of a movable backing system, in accordance with a further embodiment.

FIG. 4 is a further 3D view of the movable backing system 1 with the two work pieces W to be welded arranged between rollers 21 and 31 of the upper and the lower units 20 and 30. In contrast to the previous embodiment, four upper rollers 21 (not all visible) and two lower rollers 31 are provided. Further, in contrast to the previous embodiment, two strips 41 are provided, that are arranged outside the rollers 21 and 31; i.e. on the left and right sides of the rollers 21 and 31 and not between and surrounded by the rollers 21 and 31 as shown in the previous figures. The strips 41 connect the upper unit 20 and the lower unit 30, and the springs 51 couple the upper and the lower units 20 and 30.

The backing system 1 further comprises a pressing means 11, that allows a user to release the preferably pre-tensioned backing system 1, so that a distance between the upper and lower rollers 21 and 23 increases, which facilitates the positioning of the movable backing system 1 between the work pieces W to be welded.

FIG. 4 further shows an exemplary junction of the backing system 1 to a welding tool 60. Various other options are possible for connecting the backing system 1 to the welding tool 60. Here, the welding tool 60 comprises a spindle or bobbin 61, an upper shoulder 62, and a lower shoulder 63. The two work pieces W will be welded between the upper and the lower shoulders 62 and 63. Thus, FIG. 4 shows a friction agitation or stir welding system comprising the movable backing system 1 that clamps plate-shaped work pieces followed by a welding tool 60 to weld plate-shaped work pieces W.

Figure 5:
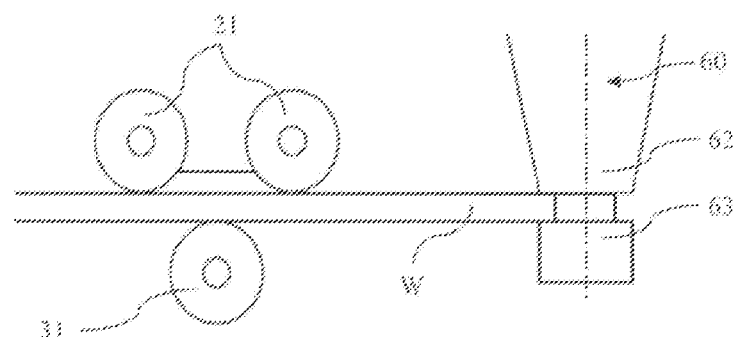
FIG. 5 illustrates a possible configuration of rollers, in accordance with an embodiment.

FIG. 5 illustrates a possible positioning and number of rollers 21 and 31 relative to the work pieces W and the welding tool 60. Since FIG. 5 is a cross section, only one work piece W and half of the numbers of rollers 21 and 31 are visible. As shown in FIG. 4, four upper rollers 21 and two lower rollers 31 are provided. The welding tool 60 is shown having shoulder 62 and lower shoulder 63.

Figure 6A:
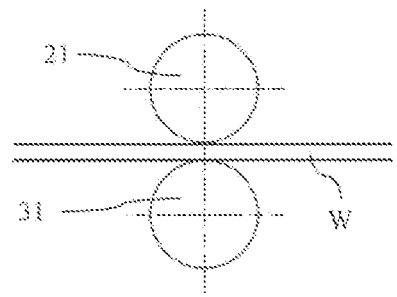
FIGS. 6A-D illustrate further possible roller configurations.
Figure 6B:
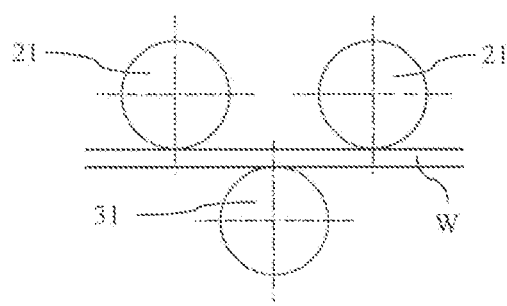
Figure 6C:
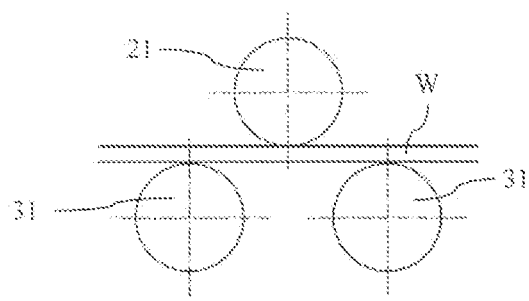
Figure 6D:
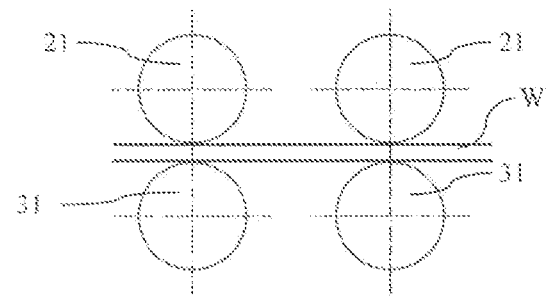

FIGS. 6A-6D also schematically show possible positionings and numbers of rollers 21 and 31 relative to the work piece W. Again, the cross-sections show only half of the rollers 21 and 31. FIG. 6A shows two upper rollers 21 and two lower rollers 31. FIG. 6B shows four upper rollers 21 and two lower rollers 31. FIG. 6C shows two upper rollers 21 and four lower rollers 31. FIG. 6D shows four upper rollers 21 and four lower rollers 31. There can be more than four rollers 21 and 31. Further, two lower rollers 31 can be replaced by one single barrel instead of the rollers 31. Generally, adjacent rollers on both sides of the gap between the work pieces W can be combined into a barrel traversing the gap. The rollers 21 and 31 can also be balls.

FIGS. 7A-7B schematically show possible positions of the rollers 21 and 31 and the strip 41. In FIG. 7A, one strip 41 passes between two pairs of upper and lower rollers 21 and 31 (only one pair is visible). In FIG. 7B, two strips 41 pass outside four pairs of upper and lower rollers 21 and 31 (only two pairs visible), which means there are two upper and two lower rollers 21 and 31 on each of the two work pieces W. Also a series of, for example, a strip 41 (or fiber), followed by a pair of rollers 21 and 31 followed by a further strip 41 followed by a further pair of rollers 21 and 31 followed by a last strip 41, is possible.

FIGS. 8A-B and 9A-B schematically show further embodiments of the movable backing system 1 with different coupling means 50. Again, each backing system 1 comprises the upper unit 20 arranged above and the lower unit 30 arranged below the two work pieces W to be welded together. The upper unit 20 comprises two upper rollers 21 and the lower unit comprises two lower rollers 31. The backing system 1 further comprises the strip 41 connecting the upper unit 20 and the lower unit 30. The backing system 1 further comprises the coupling means 50 providing a defined force between the upper and lower rollers 21 and 31 to equalize thickness tolerances between the work pieces W to be welded.

Figure 8A:
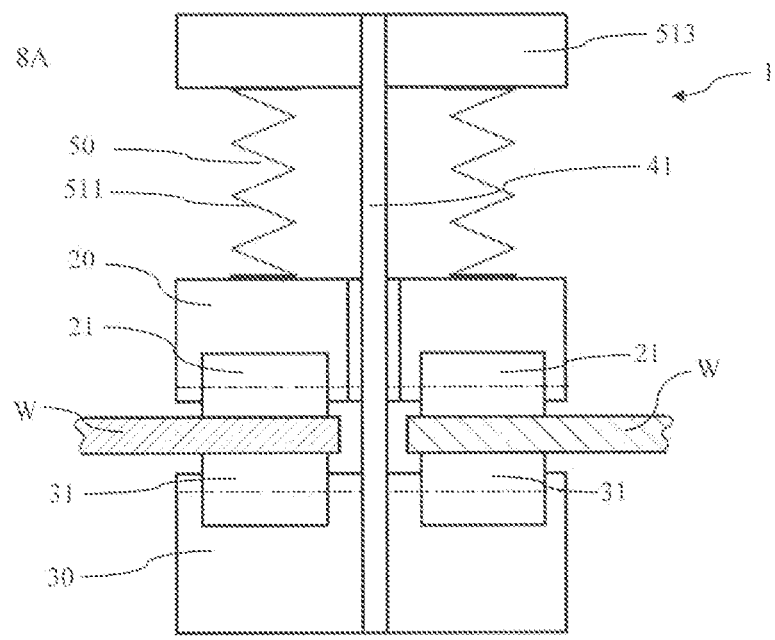
FIGS. 8A-B illustrate further embodiments of a movable backing system.
Figure 8B:
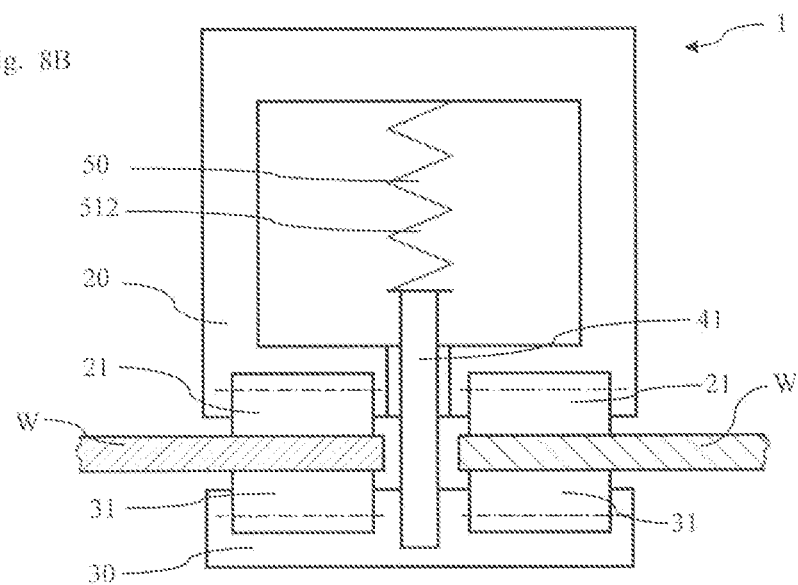

In FIG. 8A, the coupling means 50 is a pressure spring 511. The pressure spring 511 either pulls the lower rollers 31 by means of a bar 513 towards the upper rollers 21 or pushes the upper rollers 21 towards the lower rollers 31. In FIG. 8B, the coupling means 50 is a tension spring 512 that pulls the lower rollers 31 towards the upper rollers 21. The spring 511 and 512 may be a disk spring, a circular spring, a spiral spring, a leaf spring or the like.

Figure 9A:
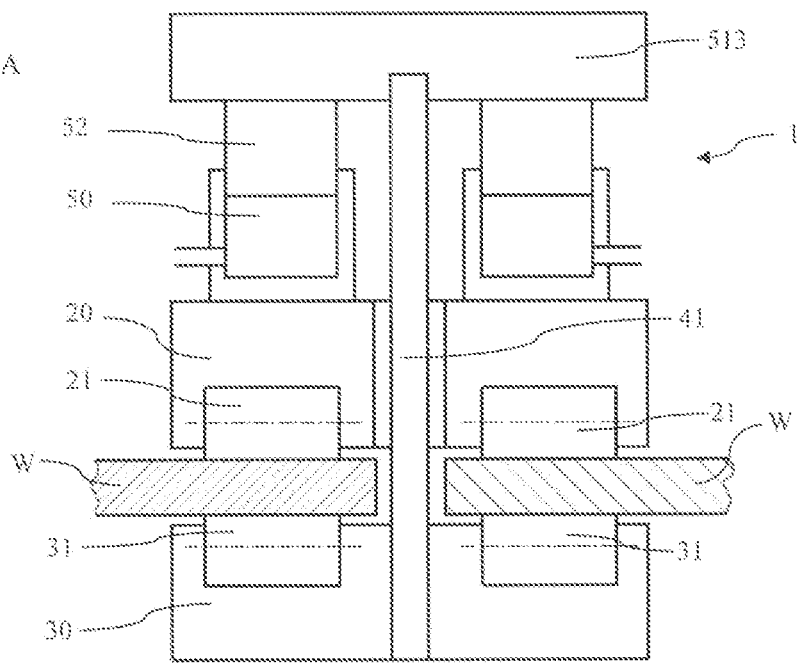
FIG. 9A-B illustrate further embodiments of a movable backing system.
Figure 9B:
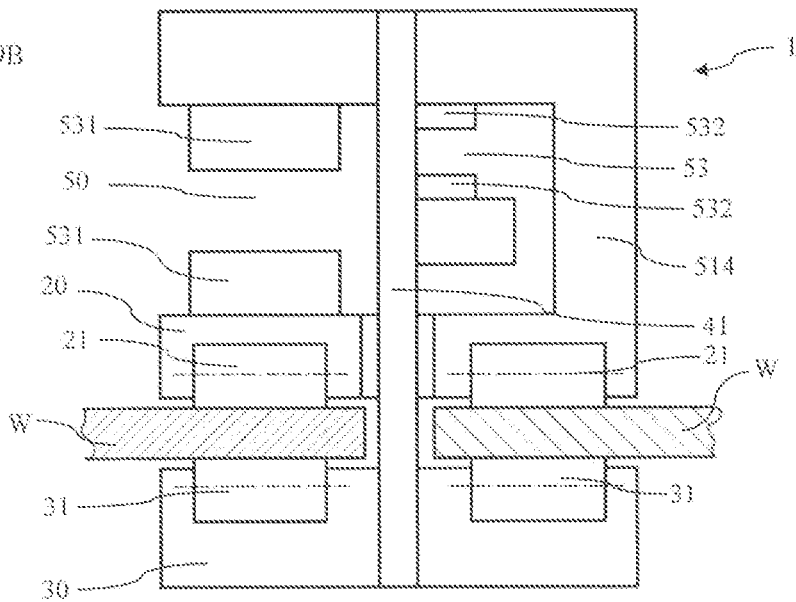

In FIG. 9A, the coupling means 50 is a hydraulic or pneumatic pressure cylinder 52. The pressure cylinder 52 pulls the lower rollers 31 by means of a bar 513 towards the upper rollers 21 or pushes the upper rollers 21 towards the lower rollers 31. In FIG. 9B, the coupling means 50 is a magnetic system 53 with equal poles 531 and opposite poles 532. The magnetic system 53 pulls the lower rollers 31 by means of a frame 514 towards the upper rollers 21 or pushes the upper rollers 21 towards the lower rollers 31. The above explained coupling means 50 can also be arranged in the lower unit 30 instead of in the upper unit 20.

Figure 10:
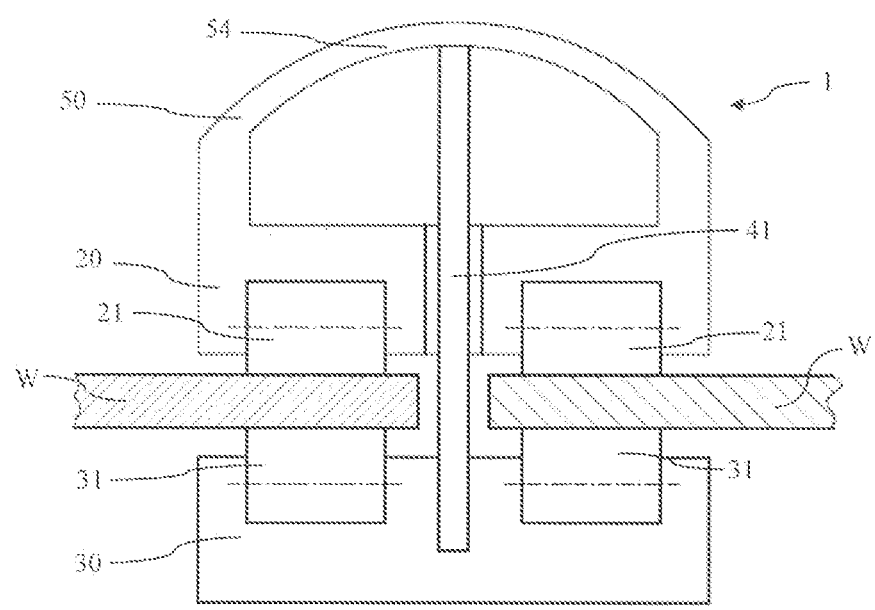
FIG. 10 illustrates still further embodiments of a movable backing system.

FIG. 10 schematically shows a further embodiment of a movable backing system 1 with a different coupling means 50. Again, each backing system 1 comprises an upper unit 20 with two upper rollers 21, a lower unit 30 with two lower rollers 31, a strip 41 connecting the upper unit 20 and the lower unit 30, and a coupling means 50 providing a defined force between the upper and lower rollers 21 and 31. Here, the coupling means 50 is provided as part of a housing of the backing system 1, in particular as its cover 54. The cover 54 acts as a leaf spring. Thus, the cover 54 and preferably also the strip 41 provide the defined force between the upper and lower rollers 21 and 31.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A movable backing system for clamping plate-shaped backing work pieces for friction agitation welding, the system comprising:
   an upper unit to be arranged above the backing work pieces to support the backing work pieces;
   a lower unit to be arranged below the backing work pieces to support the backing work pieces, and
   a connecting means connecting the upper and the lower unit to be arranged in a gap between the backing work pieces to be welded,
   wherein the upper unit comprises at least an upper roller and the lower unit comprises at least a lower roller to define the position of the plate-shaped backing work pieces to be welded.

2. The movable backing system of claim 1, wherein the upper unit comprises at least two upper rollers and/or the lower unit comprises at least two lower rollers.

3. The movable backing system of claim 1, wherein the connecting means is strip- or fiber-shaped.

4. The movable backing system of claim 1, wherein the connecting means is arranged between the rollers.

5. The movable backing system of claim 1, wherein the connecting means is arranged outside the rollers.

6. The movable backing system of claim 1, wherein at least one of the upper and the lower unit comprises coupling means for coupling the upper and the lower unit.

7. The movable backing system of claim 6, wherein the coupling means comprises at least one of a pressure spring, a tension spring, a hydraulic and/or pneumatic cylinder and/or a magnetic system.

8. The movable backing system of claim 6, wherein the coupling means is arranged in the upper unit to pull the lower rollers in the direction of the upper rollers.

9. The movable backing system of claim 6, wherein the coupling means is a housing of the backing system acting as a leaf spring.

10. The movable backing system of claim 1, wherein at least one of the upper and the lower units comprises a sensor to monitor the movement of the movable backing system.

11. The movable backing system of claim 3, wherein the strip has a width or diameter between about 1 and 0.01 mm.

12. The movable backing system of claim 1, wherein the connecting means has a tensile strength between about 500 and 2000 $N/mm^2$.

13. The movable backing system of claim 1, wherein the connecting means is made of at least one of a ceramic, stainless steel, or a high alloy steel, in particular a CrNi alloy.

14. A friction agitation welding system comprising:
a movable backing system for clamping plate-shaped backing work pieces, the backing system comprising:
an upper unit to be arranged above the backing work pieces to support the backing work pieces;
a lower unit to be arranged below the backing work pieces to support the backing work pieces, and
a connecting means connecting the upper and the lower unit to be arranged in a gap between the backing work pieces to be welded,
and a welding tool to weld plate-shaped backing work pieces, wherein the upper unit comprises at least an upper roller and the lower unit comprises at least a lower roller to define the position of the plate-shaped backing work pieces to be welded.

15. The movable backing system according to claim 3 wherein the strip has a width between about 0.5 and 0.09 mm.

16. The movable backing system according to claim 3 wherein the strip has a width between about 0.2 and 0.1 mm.

17. The movable backing system of claim 1, wherein the connecting means has a tensile strength between about 1000 and 1500 $N/mm^2$.

18. The movable backing system of claim 1, wherein the connecting means has a tensile strength between about 1200 and 1400 $N/mm^2$.

\* \* \* \* \*